(12) United States Patent
Balachandran et al.

(10) Patent No.: US 8,514,693 B2
(45) Date of Patent: Aug. 20, 2013

(54) BROADCAST AND MULTICAST IN SINGLE FREQUENCY NETWORKS USING OTHROGONAL SPACE-TIME CODES

(75) Inventors: Krishna Balachandran, Morganville, NJ (US); Joseph Kang, Belle Mead, NJ (US); Kemal Karakayali, Highland Park, NJ (US); Kiran Rege, Marlboro, NJ (US)

(73) Assignee: Alcatel Lucent, Paris (FR)

( * ) Notice: Subject to any disclaimer, the term of this patent is extended or adjusted under 35 U.S.C. 154(b) by 1081 days.

(21) Appl. No.: 12/216,823

(22) Filed: Jul. 11, 2008

(65) Prior Publication Data

US 2010/0008281 A1    Jan. 14, 2010

(51) Int. Cl.
| | |
|---|---|
| *H04J 11/00* | (2006.01) |
| *H04W 4/00* | (2009.01) |
| *H04H 20/71* | (2008.01) |
| *H04L 27/28* | (2006.01) |
| *H04B 7/02* | (2006.01) |
| *H04B 15/00* | (2006.01) |

(52) U.S. Cl.
USPC ........... 370/208; 370/312; 370/328; 370/432; 375/260; 375/267; 375/299; 375/347; 455/63.2; 455/101; 455/132

(58) Field of Classification Search
USPC ................. 370/208, 312, 328, 432; 375/260, 375/267, 299, 347; 455/63.2, 101, 132
See application file for complete search history.

(56) References Cited

U.S. PATENT DOCUMENTS

| | | | | |
|---|---|---|---|---|
| 6,788,661 | B1* | 9/2004 | Ylitalo et al. | 370/334 |
| 6,865,237 | B1* | 3/2005 | Boariu et al. | 375/295 |
| 7,123,887 | B2* | 10/2006 | Kim et al. | 455/103 |
| 7,139,324 | B1* | 11/2006 | Ylitalo et al. | 375/267 |
| 7,158,579 | B2* | 1/2007 | Hottinen | 375/267 |
| 7,301,893 | B2* | 11/2007 | Onggosanusi et al. | 370/210 |
| 7,342,875 | B2* | 3/2008 | Hammons et al. | 370/219 |
| 7,355,961 | B2* | 4/2008 | Tirkkonen | 370/208 |
| 7,430,243 | B2* | 9/2008 | Giannakis et al. | 375/267 |
| 7,430,244 | B2* | 9/2008 | Chung et al. | 375/267 |
| 7,469,152 | B2* | 12/2008 | Cetiner et al. | 455/562.1 |
| 7,499,499 | B2* | 3/2009 | Gollamudi | 375/295 |
| 7,535,821 | B2* | 5/2009 | Son et al. | 370/208 |
| 7,599,419 | B2* | 10/2009 | Jafarkhani et al. | 375/137 |
| 7,623,590 | B2* | 11/2009 | Hottinen | 375/267 |

(Continued)

FOREIGN PATENT DOCUMENTS

| | | |
|---|---|---|
| WO | WO 2006/138203 | 12/2006 |
| WO | WO 2008/057452 | 5/2008 |
| WO | WO 2008/066888 | 6/2008 |

OTHER PUBLICATIONS

International Preliminary Report on Patentability and Written Opinion dated Jan. 20, 2011.

(Continued)

*Primary Examiner* — Alpus H Hsu
(74) *Attorney, Agent, or Firm* — Harness, Dickey & Pierce (57) ABSTRACT

In one embodiment, a method of transmitting includes assigning column vectors of a generalized orthogonal space time code matrix to coverage areas of a plurality of base stations such that each coverage area is assigned one column vector. The same data is transmitted from each of the plurality of base stations in the coverage areas such that the data transmitted in each coverage area is transmitted using the column vector assigned to the coverage area.

15 Claims, 9 Drawing Sheets

(56) References Cited

U.S. PATENT DOCUMENTS

| | | | |
|---|---|---|---|
| 7,668,077 B2 * | 2/2010 | Wu et al. | 370/208 |
| 7,680,211 B1 * | 3/2010 | von der Embse | 375/299 |
| 7,720,168 B2 * | 5/2010 | Su et al. | 375/267 |
| 7,792,206 B2 * | 9/2010 | Ylitalo et al. | 375/267 |
| 7,844,010 B2 * | 11/2010 | Ylitalo et al. | 375/267 |
| RE42,098 E * | 2/2011 | Kim et al. | 455/103 |
| 7,885,354 B2 * | 2/2011 | Perlman et al. | 375/308 |
| 8,027,407 B2 * | 9/2011 | Papadopoulos | 375/299 |
| 8,059,710 B2 * | 11/2011 | Abou Rjeily | 375/239 |
| 8,059,732 B2 * | 11/2011 | Papadopoulos et al. | 375/260 |
| 8,165,194 B2 * | 4/2012 | Abou Rjeily | 375/239 |
| 8,233,558 B2 * | 7/2012 | Sirkeci et al. | 375/267 |
| 2004/0081074 A1 * | 4/2004 | Piechocki | 370/206 |
| 2005/0265280 A1 | 12/2005 | Roh et al. | |
| 2005/0286462 A1 | 12/2005 | Roh et al. | |
| 2006/0093057 A1 * | 5/2006 | Zhang et al. | 375/267 |
| 2007/0064826 A1 * | 3/2007 | El-Gamal et al. | 375/260 |
| 2007/0291638 A1 * | 12/2007 | Chae et al. | 370/208 |

OTHER PUBLICATIONS

International Search Report and Written Opinion dated Nov. 26, 2009.

* cited by examiner

BROADCAST AND MULTICAST IN SINGLE FREQUENCY NETWORKS USING OTHROGONAL SPACE-TIME CODES

BACKGROUND OF THE INVENTION

Single Frequency Networks (SFN) are often used to support broadcast applications where multiple users dispersed over the coverage area of the SFN tune to the application of common interest to all. In an SFN with multiple base stations, signals corresponding to the broadcast application are transmitted in the same frequency band by all base stations. The idea is that as mobile users move from the coverage of one base station to the next, they do not need to perform any special actions such as handoff or tuning to a different frequency band to continue to receive the signals associated with the broadcast application. A transmission technology that appears to be well-suited to SFN-based broadcast is Orthogonal Frequency Division Multiplexing (OFDM), where base stations participating in the SFN transmit identical signals over the set of sub-carriers allocated to the broadcast application. OFDM allows (within certain limits) signals transmitted by different base stations to be added at the receiver provided they all use the same set of sub-carriers to transmit an identical set of signals. In a broadcast application supported by an SFN, this scheme is expected to help receiver devices at cell edges by allowing them to process aggregate signals originating from multiple base stations rather than relying on a single base station for the received signal. However, even with OFDM, destructive interaction can take place between signals originating from different base stations because of the relative phase differences.

SUMMARY OF THE INVENTION

The present invention relates to a method of transmitting data in a single frequency network.

In one embodiment, the method includes assigning column vectors of a generalized orthogonal space time code matrix to coverage areas of a plurality of base stations such that each coverage area is assigned one column vector. The same data is transmitted from each of the plurality of base stations in the coverage areas such that the data transmitted in each coverage area is transmitted using the column vector assigned to the coverage area.

The present invention also relates to a single frequency network.

In one embodiment, the single frequency network includes a plurality of base stations. The base stations are configured to perform at least one of broadcasting and multicasting data over a same frequency. The plurality of base stations each have at least one coverage area, and each coverage area is assigned a column vector of a generalized orthogonal space time code matrix. The plurality of base stations transmit the broadcast or multicast data in each coverage area using the column vector assigned to the coverage area.

The present invention still further relates to a method of receiving data in a single frequency.

In one embodiment, the method includes deriving a modified received signal vector from received signal samples, and multiplying the modified received signal vector by a receiver filter matrix. The receiver filter matrix includes at least one channel estimate coefficient associated with each column vector of a generalized orthogonal space time code to obtain decision metrics. Data represented by the received signal samples is decoded based on the obtained decision metrics.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

In the following description, for purposes of explanation and not limitation, specific details are set forth such as particular architectures, interfaces, techniques, etc., in order to provide a thorough understanding of the present invention. However, it will be apparent to those skilled in the art that the present invention may be practiced in other illustrative embodiments that depart from these specific details. In some instances, detailed descriptions of well-known devices, circuits, and methods are omitted so as not to obscure the description of the present invention with unnecessary detail. All principles, aspects, and embodiments of the present invention, as well as specific examples thereof, are intended to encompass both structural and functional equivalents thereof. Additionally, it is intended that such equivalents include both currently known equivalents as well as equivalents developed in the future.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that perform particular tasks or implement particular abstract data types. The program modules and functional processes discussed herein may be implemented using existing hardware in existing communication networks. For example, program modules and functional processes discussed herein may be implemented using existing hardware at existing network elements or control nodes. Such existing hardware may include one or more digital signal processors (DSPs), application-specific-integrated-circuits, field programmable gate arrays (FPGAs) computers or the like.

Portions of the embodiments and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The embodiments are not limited by these aspects of any given implementation.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

The embodiments will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples. Where applicable, the words and phrases used herein should be understood and interpreted to have a meaning consistent with the understanding of those words and phrases by those skilled in the relevant art.

As used herein, the term "mobile station" may be considered synonymous to, and may hereafter be occasionally referred to, as a client, mobile, mobile unit, mobile station, mobile user, user equipment (UE), subscriber, user, remote station, access terminal, receiver, etc., and may describe a remote user of wireless resources in a wireless communication network. The wireless resource may be a mobile phone, wireless equipped personal computer, etc. The term "base station" may be considered synonymous to and/or referred to as a base transceiver station (BTS), NodeB, extended Node B, femto cell, access point, etc. and may describe equipment that provides the radio-frequency (RF) and baseband functions for data and/or voice connectivity between a network and one or more users.

As is well-known in the art, each of a mobile and a base station may have transmission and reception capabilities. Transmission from the base station to the mobile is referred to as downlink or forward link communication. Transmission from the mobile to the base station is referred to as uplink or reverse link communication.

Consider a Single Frequency Network (SFN) supporting a broadcast application. For illustrative purposes, we assume that the SFN uses a multi-carrier transmission scheme such as Orthogonal Frequency Division Multiplexing (OFDM). In such a scheme, identical signals are transmitted by each of the participating base stations on each tone or sub-carrier being used for the broadcast application. Moreover, these signals are time-aligned within permissible limits. Now, if a receiver device listening to the broadcast application receives signals from multiple base stations, the difference between the transmission delays corresponding to different base stations would cause the signals to arrive at the receiver at somewhat different times. However, as long as the relative delays for different base stations are within a certain limit (corresponding to the cyclic prefix in an OFDM system), there is no inter-symbol interference due to this delay spread, which in many other transmission technologies can only be mitigated with sophisticated equalization techniques.

Now consider a receiver device (e.g., a mobile station) that receives signals from N base stations participating in an SFN using an OFDM transmission scheme. Let $x^{(k)}(t)$ denote the symbol transmitted by all of these base stations using the $k^{th}$ sub-carrier during time-slot t. The corresponding received signal is then given by $$r^{(k)}(t) = \sum_{i=1}^{N} h_i^{(k)}(t) x^{(k)}(t) + n^{(k)}(t), \tag{1}$$

where for $i=1, 2, \ldots, N$, $h_i^{(k)}(t)$ denotes the channel coefficient for the signal transmitted by the $i^{th}$ base station over the $k^{th}$ sub-carrier during time-slot t, and $n^{(k)}(t)$ represents the thermal noise in the corresponding received signal. Note that as the above equation indicates, the signals being received from different base stations cannot be separated so that the entire received signal for any sub-carrier (say, k) appears as if it is being received over a channel with channel coefficient given by $$h^{(k)}(t) = \sum_{i=1}^{N} h_i^{(k)}(t). \tag{2}$$

The resulting signal-to-interference-plus-noise ratio (SINR), denoted by $\rho^{(k)}(t)$, equals $$\rho^{(k)}(t) = \left| \sum_{i=1}^{N} h_i^{(k)}(t) \right|^2 E\left[|x^{(k)}(t)|^2\right] / \sigma^2, \tag{3}$$

where $\sigma^2$ represents the variance of the sum of receiver noise and interference. Note that SFN, transmissions from neighboring base stations generally improve the signal rather than introduce interference. The exception is the distant base stations whose transmissions are received outside the cyclic prefix of the OFDM system. These (latter) transmissions, which contribute interference to the received signal, are often negligible due to distance loss. Now, the N channel coefficients, $h_i^{(k)}(t)$, are uncorrelated in phase since they are associated with different base stations. As a consequence, the aggregate channel coefficient, $h^{(k)}(t)$, can have a large or small magnitude depending on whether the individual channel coefficients add constructively or destructively. Thus, the signal quality for a given receiver can be extremely poor even if the aggregate signal power, i.e. the sum of the individual signal powers, received from base stations within its range is acceptable. In a broadcast or multicast application requiring a given data rate, often the objective is to serve at least a certain fraction (e.g. 95%) of the potential user population in as efficient a manner as possible. Whether this objective can be met at a given transmit power level is determined by the lower percentiles (e.g. $5^{th}$ percentile if at least 95% of the population is to be served) of the SINR distribution. Destructive signal addition caused by phase differences suppresses the lower percentiles of the SINR distribution, which means that a higher transmit power needs to be used in order to meet the coverage objective. Depending on the operational and device constraints, higher transmit powers may not always be feasible.

Since we have assumed an OFDM or a similar multi-carrier system, which allows us to consider each sub-carrier independently, we drop the index indicating the sub-carrier of interest from our equations. Similarly, with the further assumption that our equations address the system at a particular time instant, we drop the time parameter, t, from our equations as well. Thus, we re-write equations (1), (2) and (3) as $$r = \sum_{i=1}^{N} h_i x + n, \tag{1a}$$

$$h = \sum_{i=1}^{N} h_i, \tag{2a}$$

and $$\rho = \left| \sum_{i=1}^{N} h_i \right|^2 E[|x|^2] / \sigma^2, \tag{3a}$$

with the implicit assumption that we are talking about a specific sub-carrier during a particular time-slot.

A communication system employing generalized complex orthogonal space-time codes is one where complex data symbols (e.g. those associated with QPSK or M-QAM signaling) to be transmitted are first grouped in sets of m symbols, and then each such set of m symbols is transmitted from n antennas over p time-slots in the following manner: Over the p time-slots, each of the n antennas gets to transmit each of the m symbols (possibly modified via "negation" and/or "conjugation"); moreover, the vectors of symbols transmitted over the p time-slots from any pair of antennas are mutually orthogonal. Since m symbols are transmitted over p time-slots, the coding rate for this transmission scheme works out to m/p. The p-dimensional symbol vectors associated with each of the n antennas can be arranged as columns of a p×n matrix, G, which is referred to as the code matrix. The following example is an illustration of a generalized complex space-time code.

In this example embodiment, complex data symbols are grouped into sets of four symbols each, and then each set of 4 symbols (i.e., m=4) are transmitted from 3 antennas (n=3) over 8 time-slots (p=8). The corresponding G matrix is as shown below, where the four data symbols are denoted by $x_1$, $x_2$, $x_3$ and $x_4$ and, for $i=1, 2, 3$ and $4$, $x_i^*$ denotes the complex conjugate of $x_i$.

$$G = \begin{bmatrix} x_1 & x_2 & x_3 \\ -x_2 & x_1 & -x_4 \\ -x_3 & x_4 & x_1 \\ -x_4 & -x_3 & x_2 \\ x_1^* & x_2^* & x_3^* \\ -x_2^* & x_1^* & -x_4^* \\ -x_3^* & x_4^* & x_1^* \\ -x_4^* & -x_3^* & x_2^* \end{bmatrix} \tag{4}$$

In this example embodiment, the four data symbols are transmitted over 8 time-slots in the following manner: the first antenna transmits the symbols indicated by the first column of the G matrix (i.e., the first antenna transmits the symbols $x_1$, $-x_2$, $-x_3$, $-x_4$, $x_1^*$, $-x_2^*$, $-x_3^*$ and $-x_4^*$ over the 8 time-slots); the second antenna transmits the symbols indicated by the second column of G; and the third antenna transmits those indicated by the third column of G. It is easy to verify that any two columns of the code matrix G are mutually orthogonal. The rate associated with the corresponding generalized orthogonal space-time code is $4/8=1/2$. It has been shown that a rate $1/2$ generalized complex orthogonal code exists for any positive integer value of the parameter n, which corresponds to the number of transmit antennas.

Now consider a receiver device (e.g., a mobile station) that receives signals transmitted by all three antennas in the current example. Let $h_1$, $h_2$, $h_3$ respectively denote the channel coefficients between the three transmit antennas and the receiver device. We assume that the three channel coefficients remain constant for the eight time-slots over which the four data symbols belonging to one symbol set are transmitted. With this assumption, we can write $$\underline{r} = G\underline{h} + \underline{n}, \quad (5)$$

where the 8-dimensional vector $\underline{r}(=[r_1, r_2, \ldots, r_8]^T)$ represents the received signal over the eight time-slots, and entries of the 8-dimensional vector $\underline{n}(=[n_1, n_2, \ldots, n_8]^T)$ represent the corresponding noise components. The 3-dimensional vector $\underline{h}$ equals $[h_1\ h_2\ h_3]^T$. (The notation $(.)^T$ represents the transpose of the corresponding matrix or vector.)

Now, let $\underline{\acute{r}} = [\acute{r}_1, \acute{r}_2, \ldots, \acute{r}_8]^T = [r_1, r_2, r_3, r_4, r_5^*, r_6^*, r_7^*, r_8^*]^T$. We refer to the vector $\underline{\acute{r}}$ as the modified received signal vector. It is easy to verify that we can write $$\underline{\acute{r}} = \hat{H}\underline{x} + \underline{\acute{n}}, \quad (6)$$

where $\underline{x}$ equals $[x_1, x_2, x_3, x_4]^T$, $\underline{\acute{n}}$ equals $[n_1, n_2, n_3, n_4, n_5^*, n_6^*, n_7^*, n_8^*]^T$, and the matrix $\hat{H}$ is given by:

$$\hat{H} = \begin{bmatrix} h1 & h2 & h3 & 0 \\ h2 & -h1 & 0 & -h3 \\ h3 & 0 & -h1 & h2 \\ 0 & h3 & -h2 & -h1 \\ h1^* & h2^* & h3^* & 0 \\ h2^* & -h1^* & 0 & -h3^* \\ h3^* & 0 & -h1^* & h2^* \\ 0 & h3^* & -h2^* & -h1^* \end{bmatrix} \quad (7)$$

Note that columns of the matrix $\hat{H}$ are mutually orthogonal and that the square of the magnitude of each column equals $2(|h_1|^2+|h_2|^2+|h_3|^2)$. Therefore, if we pre-multiply (6) by $\hat{H}^{*T}$, we obtain $$\underline{\hat{w}} = \begin{bmatrix} \hat{w}_1 \\ \hat{w}_2 \\ \hat{w}_3 \\ \hat{w}_4 \end{bmatrix} = \hat{H}^{*T}\underline{\acute{r}} = 2(|h_1|^2 + |h_2|^2 + |h_3|^2)\underline{x} + \underline{\breve{n}}, \quad (8)$$

where $\underline{\breve{n}} = \hat{H}^{*T}\underline{\acute{n}}$. This means that after the simple linear processing of the vector $\underline{\acute{r}}$, represented by the pre-multiplication by $\hat{H}^{*T}$, the components of the output vector $\underline{\hat{w}}$ equal a simple sum of the corresponding data symbol (with some amplification) and a noise component. We refer to the matrix $\hat{H}^{*T}$ as the receiver filter matrix. For a given set of channel coefficients, $h_1$, $h_2$, and $h_3$, the expected value of the square of the magnitude of the signal component corresponding to any data symbol $x_i$ is $4(|h_1|^2+|h_2|^2+|h_3|^2)^2 E[|x_i|^2]$ whereas the variance of the noise component equals $2(|h_1|^2+|h_2|^2+|h_3|^2)\sigma^2$ where $\sigma^2 = E[|n_i|^2]$ in (5). This results in a signal-to-noise ratio $$\rho_i = 2(|h_1|^2 + |h_2|^2 + |h_3|^2)E[|x_i|^2]/\sigma^2. \quad (9)$$

The expression for the SINR at a receiver where signals transmitted from some of the antennas are too weak for reception can be obtained by setting the corresponding channel coefficients to 0 in equation (8). Note that for a receiver to be able to decode the transmitted symbols, it is not necessary to receive signals transmitted from all three antennas. As long as the SINR resulting from the signals received from one or more antennas is strong enough, the receiver can successfully decode the transmitted symbols. While we have used an example of a specific generalized orthogonal space-time code (with m=4, n=3 and p=8), all such space-time codes exhibit the properties described above.

It is revealing to compare equation (9) with equation (3). The factor "2" that appears in the expression for SINR in (9) can be attributed to the fact that each antenna effectively transmits every data symbol twice in a system employing the orthogonal space-time code described above. However, the key difference is the other factor—"$(|h_1|^2+|h_2|^2+|h_3|^2)$" in the case of the system using an orthogonal space-time code with n=3, and "$(h_1+h_2+h_3)^2$" for an ordinary SFN with n=3 transmit antennas. As we mentioned earlier, because of the relative phases associated with the channel coefficients corresponding to different transmit antennas, the quantity $|h_1+h_2+h_3|^2$ can be unacceptably small even when the sum of individual signal powers received from different antennas is adequate. On the other hand, the quantity "$|h_1|^2+|h_2|^2+|h_3|^2$" corresponds to the sum of the individual signal powers, and, as such, does not suffer from possibly destructive addition of signal components because of phase differences. In fact, signals being received from different antennas make positive contributions to the overall signal quality, affording a full diversity benefit to the receiver. Consequently, the lower percentiles of the SINR distribution, which, as we saw earlier, determine the transmit power needed to provide the desired coverage, exhibit marked improvement when compared to ordinary SFN networks.

The above discussion assumes that there is a single antenna at the receiver. It is easy to see how the analysis can be extended to receivers with multiple antennas. Specifically, for a receiver with K antennas, the receiver filter matrix, $\hat{H}^{*T}$, is determined for each of the K antennas. Then, independently for each antenna, the receiver obtains the decision metric vector ($\underline{\hat{w}}$) by pre-multiplying the corresponding modified received signal vector with the receiver filter matrix associated with that antenna. The final decision metrics are then computed by summing the decision metric vectors corresponding to all receiver antennas.

The preceding analysis shows that if a set of antennas transmitted a common stream of data symbols using different (mutually orthogonal) column vectors of a generalized orthogonal space time code, a receiver device that is within the range of a subset of these antennas can decode the (common) data stream without suffering from the potentially destructive interaction between signals caused by relative phase differences. Thus, one way to achieve such an arrangement is to construct a generalized orthogonal space-time code with parameter n (which corresponds to the number of column vectors of the code matrix G) large enough so that each base station antenna participating in the SFN can be assigned a distinct column vector. This would ensure that no matter where the receiver device is located, if it receives signals from multiple antennas participating in the SFN, those antennas will be transmitting the common data stream using mutually orthogonal column vectors of the code matrix G. As a consequence, there will be no destructive interaction between the signals coming from different antennas because of relative phase differences.

However, in large SFNs, each with possibly hundreds of base stations, it is impractical to adopt a generalized orthogonal space-time code where a distinct orthogonal column vector can be assigned to each base station antenna participating in the SFN. This is due to the following reason: although generalized orthogonal codes (at rate ½) exist for any value of the parameter n (which corresponds to the number of distinct column vectors of the code matrix), a large value of this parameter forces the other parameter of the code (i.e. p, which represents the number of rows of the code matrix) to be large as well. Since the efficacy of the code (which depends on the orthogonality of the column vectors of the $\hat{H}$ matrix) improves with less channel variation over the p time-slots used by each antenna to transmit its column vector, a large value of the parameter p may have a detrimental effect on performance or limit applicability, especially in today's world where a large fraction of users are likely to be mobile and have time-varying channels. What this means is that the parameters n and p of the space-time code will have to be reasonably small if the code is to be effective in an SFN with mobile users. We address this apparently conflicting set of requirements through code (vector) reuse.

Note that from a receiver's perspective, it does not matter whether all the base station antennas participating in the SFN use distinct (orthogonal) column vectors of the space-time code. As long as the antennas whose signals are strong enough when they reach the receiver device use distinct column vectors of the space-time code, those signals will not combine in a destructive manner due to phase differences. Thus, we use a (relatively) small space-time code and assign the column vectors of its code matrix to different base station antennas in such a manner that at points in the coverage area of the SFN where signals from multiple base station antennas are received, the column vectors assigned to those base station antennas are likely to be distinct. We try to ensure that if the signals from any given set of base station antennas can reach some points at significant levels, those base station antennas are assigned distinct column vectors of the space-time code. We illustrate this concept with a few examples. In the following, we refer to the number of column vectors of the code matrix G (i.e. the parameter n of the space-time code) as the "reuse parameter."

Figure 1:
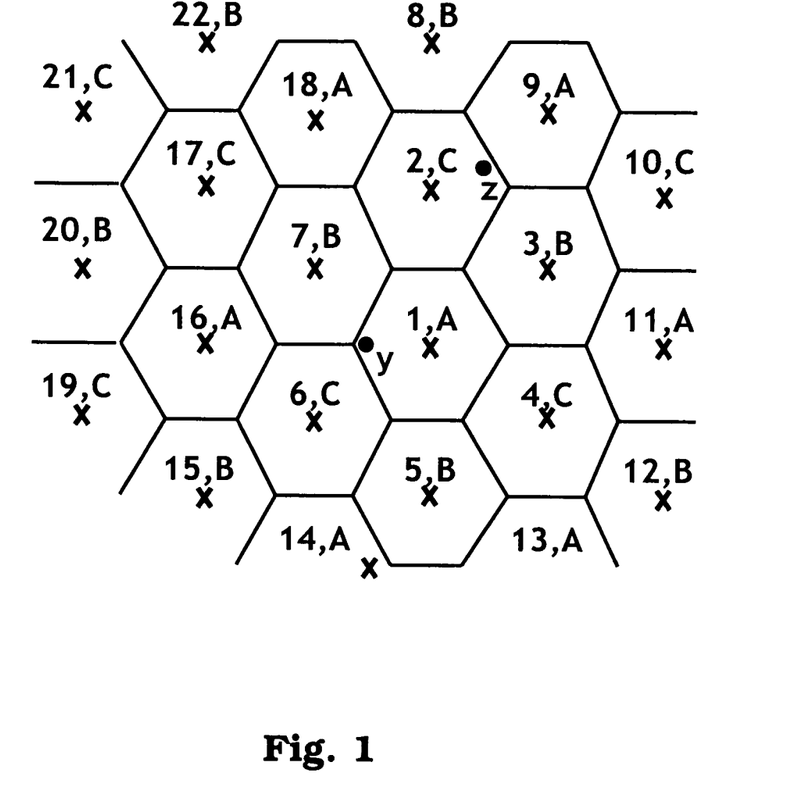
FIG. 1 shows a cellular arrangement of the base stations participating in an SFN where each base station has an omni-directional antenna and, therefore, a single coverage area.

Consider the generalized orthogonal space-time code represented by the code matrix G in equation (4). We refer to the first, second and third column vectors of G respectively as columns A, B and C, respectively. FIG. 1 shows a cellular arrangement of the base stations participating in an SFN. It is assumed here that all base stations have omni-directional antennas, which would result in a hexagonal cell-pattern under ideal conditions. Thus each base station has a single coverage area. The base stations (and the corresponding cells) are numbered 1, 2, 3, . . . , and the locations of the base station antennas are marked with an "x." A letter "A," "B" or "C" appears next to each number representing the identifier of the corresponding base station. This letter refers to the column vector of the code matrix G that has been assigned to the corresponding base station antenna and/or coverage area. Thus, the base station 1's antenna and/or coverage area has been assigned the column vector A, base station 2's antenna and/or coverage area has been assigned the column vector C, and so on. As shown in FIG. 1, the coverage areas are assigned the A, B, and C column vectors in such a manner that no two adjacent coverage areas have the same column vector assignment.

In the case of a broadcast application, each base station participating in the SFN continuously transmits signals associated with that application in accordance with the column vector of the code matrix assigned to it. This happens regardless of whether any receiver device is within range of that base station.

The operation of a multicast application, in accordance with the present invention, is a little different. In an SFN supporting a multicast application, each base station is permanently assigned a column vector of the code matrix (just as in the case of a broadcast application.) However, a base station transmits signals associated with the multicast application only if one or more user devices listening to that application are within its range. Thus, normally, when there are no user devices within range of a base station, the latter does not transmit any signals associated with the multicast operation. When a user device within its range tunes to the multicast or a device already tuned to the multicast moves within its range (e.g., notified by uplink signaling), the base station starts transmitting signals associated with the multicast. When the base station transmits these signals, the base station encodes them using the column vector of the code matrix assigned to the base station (just as in a broadcast application.) Note that even in an SFN supporting a multicast application, all base stations use identical sub-carriers and are synchronized with one another within permissible limits. We would also like to point out that a user device can be within range of several base stations at the same time, e.g. when it is in a "soft handoff" area.

Now consider a mobile station y in the coverage area of cell 1 as shown in FIG. 1. Since mobile station y is close to that cell's boundary with cells 6 and 7, the mobile station y is likely to receive signals from the antennas of base stations 6 and 7 in addition to those from base station I's antenna. However, as one can see in FIG. 1, the three antennas use three distinct column vectors of the code matrix G. As a consequence, their signals will not interfere destructively with one another when the receiver in mobile station y attempts to decode them. Namely, the mobile station y will receive and decode the signals as exemplified by equation (8). It will be appreciated that channel estimation techniques are well-known, and any such technique may be used to derive the matrix h, and thus $\hat{H}$ or $\hat{H}^{*T}$. Similarly, a mobile station z in cell 2's coverage area receives signals from the antennas of base station 2 and base station 9. Once again, we can see that these antennas use distinct column vectors of matrix G so that there is no destructive interference between the signals transmitted by these antennas when the receiver of mobile station z attempts to decode them.

Figure 2:
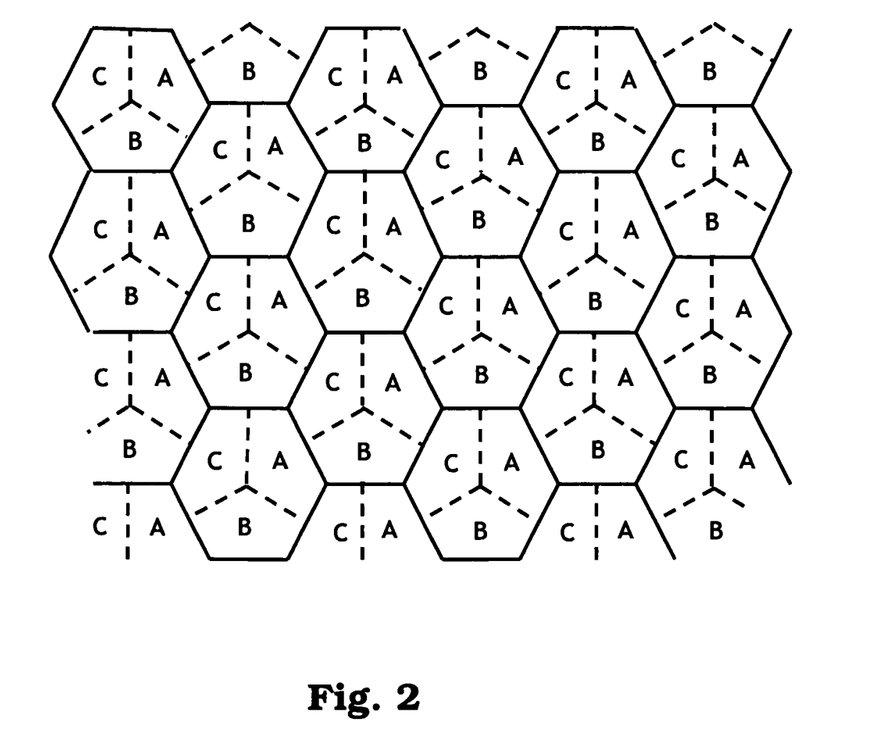
FIG. 2 illustrates such an example where each base station has a 3-sector antenna and therefore three coverage areas.

FIG. 1 illustrates the concept of code (vector) reuse in an SFN with omni-directional base station antennas. Similar code (vector) reuse can be implemented in SFNs with sectorized antennas as well. FIG. 2 illustrates such an example where each base station has a 3-sector antenna and therefore three coverage areas. Only the column vectors assigned to different sectors have been shown in FIG. 2; the base station and sector identifiers have been omitted to avoid cluttering of the figure. The same space-time code with reuse parameter 3 that was used in the previous example is used here as well. With sectorized base station antennas, each sector (i.e., coverage area) of a base station needs to be assigned a different column vector. It is easy to see that the column vector assignment shown in FIG. 2 would ensure that if a mobile station receives signals from multiple sectors (of the same cell or different cells), those sectors are likely to be using different column vectors of the code matrix. As shown in FIG. 2, each upper right sector of a base station is assigned column vector A, each bottom sector of a base station is assigned column vector B, and each upper left sector is assigned column vector C. This embodiment is not limited to these column vector assignments. Instead, the column vector assignments for each base station should be the same, which insures that no two adjacent sectors have a same column vector assignment.

Figure 3:
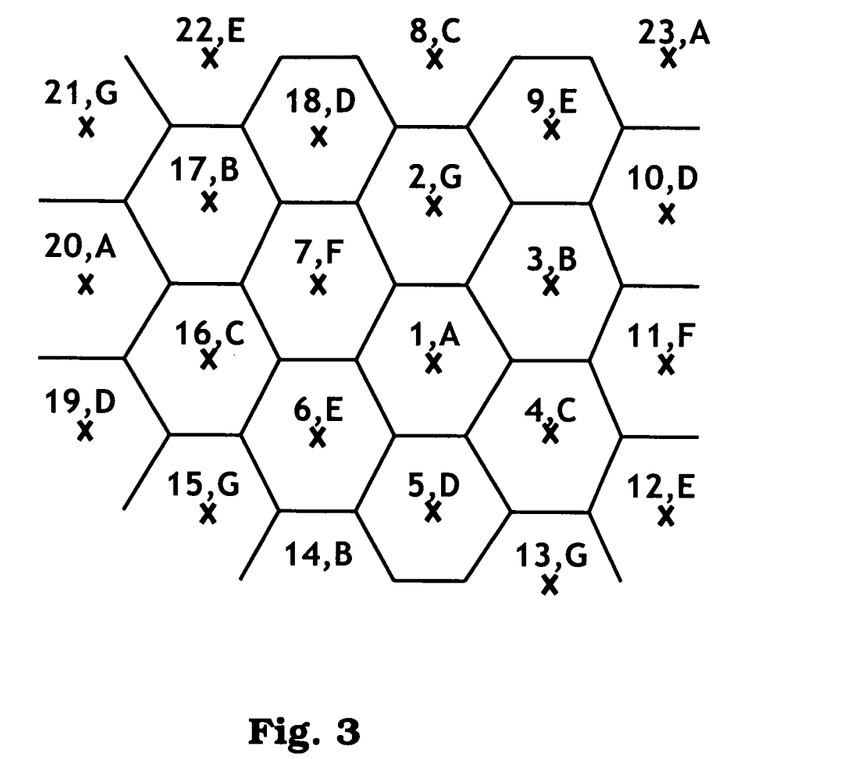
FIG. 3 shows another cellular arrangement of the base stations participating in an SFN.

We have used a generalized orthogonal space-time code with a 3-column code matrix to illustrate the concepts of the example embodiments. It is easy to see how generalized orthogonal space-time codes with code matrices of different sizes can be used to implement different reuse patterns. For instance, for a reuse pattern with 7 distinct column vectors, one could use the generalized orthogonal space-time code with code matrix $G_2$ shown below. The resulting column vector assignment is shown in FIG. 3, where the first through seventh columns of $G_2$ have been respectively labeled A, B, C, D, E, F and G.

$$G_2 = \begin{bmatrix} x1 & x2 & x3 & x4 & x5 & x6 & x7 \\ -x2 & x1 & x4 & -x3 & x6 & -x5 & -x8 \\ -x3 & -x4 & x1 & x2 & x7 & x8 & -x5 \\ -x4 & x3 & -x2 & x1 & x8 & -x7 & x6 \\ -x5 & -x6 & -x7 & -x8 & x1 & x2 & x3 \\ -x6 & x5 & -x8 & x7 & -x2 & x1 & -x4 \\ -x7 & x8 & x5 & -x6 & -x3 & x4 & x1 \\ -x8 & -x7 & x6 & x5 & -x4 & -x3 & x2 \\ x1^* & x2^* & x3^* & x4^* & x5^* & x6^* & x7^* \\ -x2^* & x1^* & x4^* & -x3^* & x6^* & -x5^* & -x8^* \\ -x3^* & -x4^* & x1^* & x2^* & x7^* & x8^* & -x5^* \\ -x4^* & x3^* & -x2^* & x1^* & x8^* & -x7^* & x6^* \\ -x5^* & -x6^* & -x7^* & -x8^* & x1^* & x2^* & x3^* \\ -x6^* & x5^* & -x8^* & x7^* & -x2^* & x1^* & -x4^* \\ -x7^* & x8^* & x5^* & -x6^* & -x3^* & x4^* & x1^* \\ -x8^* & -x7^* & x6^* & x5^* & -x4^* & -x3^* & x2^* \end{bmatrix} \quad (10)$$

System Implementation

As we saw earlier, in an SFN employing the OFDM technology, in order to support a broadcast application all antennas participating in the SFN have to use the same set of sub-carriers to carry the broadcast data stream. Moreover, if an antenna uses a specific sub-carrier to transmit a given set of data symbols within the broadcast stream, all antennas in the SFN must use the same sub-carrier to transmit that set of data symbols. Also, each data symbol has to be modulated in an identical manner at all antennas. Changes to this mode of operation are made when we employ generalized orthogonal space-time coding with code (vector) reuse in an SFN according to the above described embodiments. We describe these changes using the space-time code with reuse factor 3 as an illustrative example.

Figure 4:
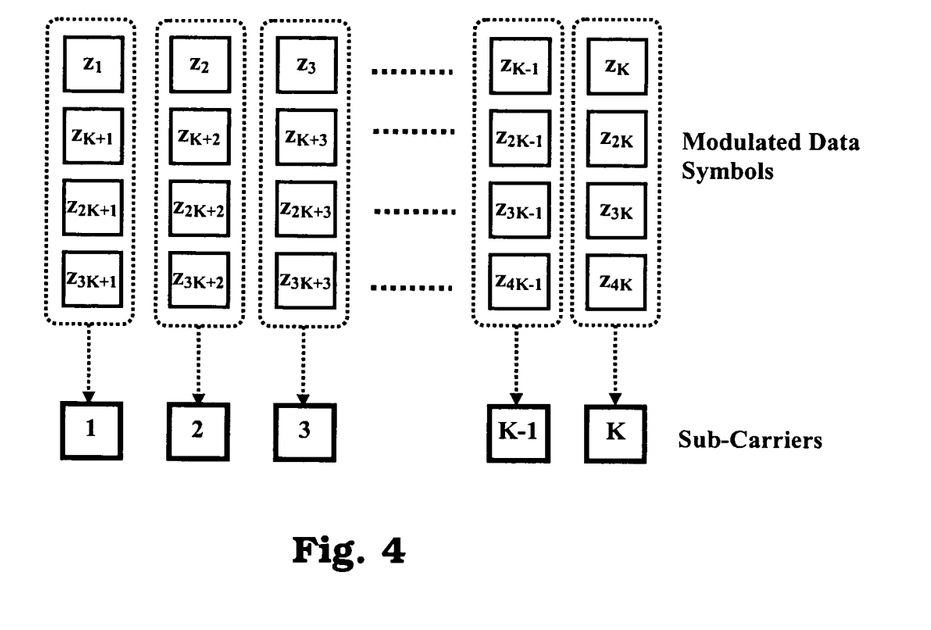
FIG. 4 illustrates an assignment of the first block of 4K modulated data symbols to K sub-carriers.

Let us assume that K sub-carriers have been assigned at each base station to support the broadcast application. Although these sub-carriers can be anywhere in the spectrum being used by the SFN, we refer to these sub-carriers by the indices 1, 2, . . . , K. The modulated data symbols in the broadcast stream (which could be in a QPSK or M-QAM format) are denoted by z1, z2, z3, . . . . Recall that with the space-time code with reuse factor 3, four data symbols are transmitted over eight time-slots on each sub-carrier. Therefore, one way to implement this in a systematic manner would be to have each base station (or sector in the case of sectorized antennas) transmitter group the modulated data symbols in sets of size 4K, where K is the number of sub-carriers. Each such set of data symbols will be referred to as a "block." Thus, the first such block would be: z1, z2, z3, . . . , z4K. The second such block would be: z4K+1, z4K+2, . . . , z8K, and so on. When the first block of 4K data symbols is ready for transmission, the transmitter assigns the symbols z1, zK+1, z2K+1, and z3K+1 to the first sub-carrier, the symbols z2, zK+2, z2K+2, and z3K+2 to the second sub-carrier, and so on. A similar assignment is carried out when each block of 4K modulated data symbols is ready for transmission. FIG. 4 illustrates this assignment for the first block of 4K modulated data symbols.

Figure 5A:
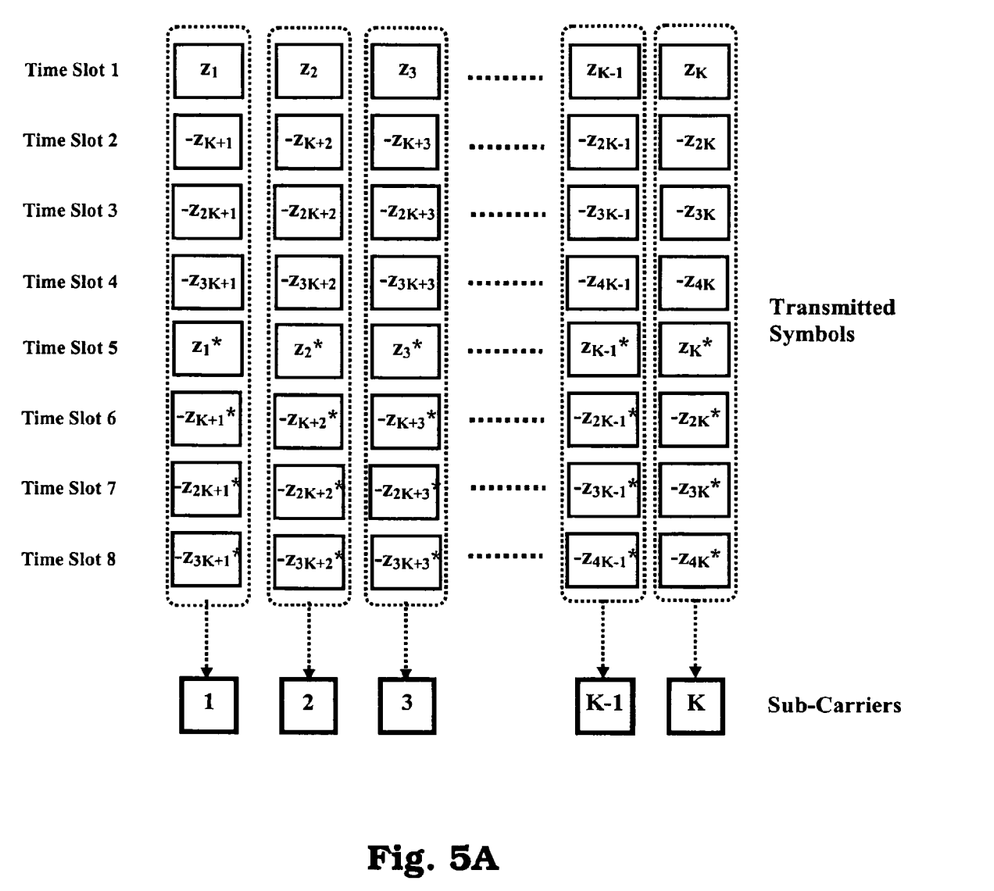
FIGS. 5A, 5B and 5C show the symbols that are actually transmitted on the K sub-carriers by a base station transmitter that has been assigned column vectors A, B and C, respectively, of the code matrix.

In accordance with the embodiments, the assignment of modulated data symbols to sub-carriers is performed in an identical manner (as shown in FIG. 4) by all base station transmitters. However, the symbols that are actually transmitted over the next 8 time-slots by a base station transmitter depend on the column vector of the code matrix G assigned to the base station. For instance, consider a base station that has been assigned column vector A (i.e. the first column) of the code matrix G. Equation (4) shows that if modulated data symbols x1, x2, x3 and x4 are to be transmitted on a particular sub-carrier over eight time-slots, the symbols that are actually transmitted by that base station over this period are: x1, −x2, −x3, −x4, x1, −x2*, −x3* and −x4*. The base station independently applies this transformation to the set of symbols assigned to each sub-carrier to obtain the corresponding set of symbols that are actually transmitted over the corresponding eight time-slots. FIG. 5A shows the symbols that are actually transmitted on the K sub-carriers by a base station transmitter that has been assigned column vector A of the code matrix.

Figure 5B:
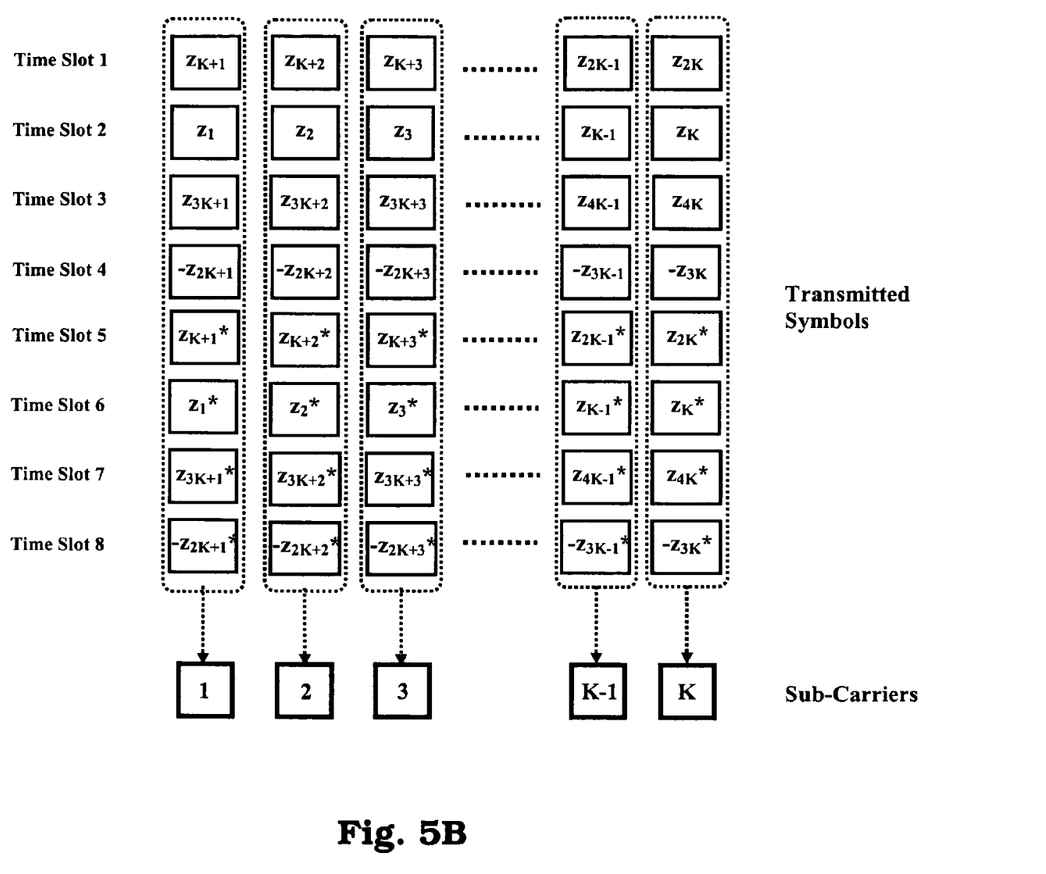
Figure 5C:
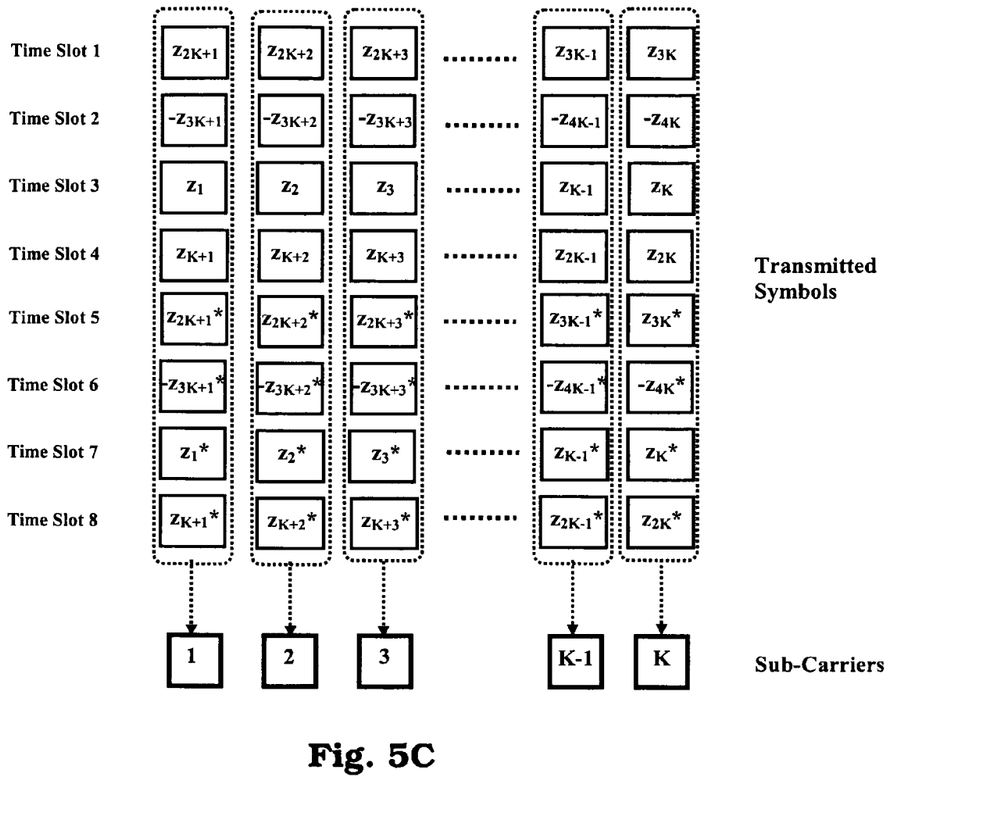

For the same set of modulated data symbols (i.e. z1, z2, z3, . . . , z4K), FIGS. 5B and 5C show the symbols that are actually transmitted by base stations that have been assigned column vectors B and C, respectively.

At the receiver device (e.g., mobile station), the signals received over the eight time-slots used to transmit one block of data symbols are demodulated in the following manner:

For each sub-carrier k, where k=1, 2, . . . , K, the receiver of the mobile station maintains three estimates of channel coefficients: $\hat{h}_A(k)$, $\hat{h}_B(k)$ and $\hat{h}_C(k)$, where $\hat{h}_A(k)$ is the receiver's estimate of the aggregate channel coefficient (for sub-carrier k) for all base stations that have been assigned the column vector A. As we saw previously, signals from two base stations can be separated (because of the space-time code) only if they use different column vectors of the code matrix. Conversely, if a receiver receives signals from multiple base stations using the same column vectors of the code matrix, the receiver cannot separate the signals into components that can be attributed to different base stations. As a consequence, as far as signals from base stations using the same column vector are concerned, the receiver can only deal with sums (i.e. aggregates) of these signals. The channel coefficients in this case are also aggregates; that is, they are the receiver's estimate of the "sum" channel, in which the signals from all base stations with the same column vector are added together before the receiver processes them. Similarly, $\hat{h}_B(k)$ and $\hat{h}_C(k)$ are the receiver's aggregate channel estimates for all base stations that have been assigned column vectors B and C, respectively. These estimates can be obtained via standard techniques such as periodically inserted pilot symbols, etc.

Any of these aggregate channel coefficients can be 0 if the signals from the corresponding base stations are too weak to be detected by the receiver device. For each sub-carrier k (where k=1, 2, ..., K), the receiver forms the 8×3 matrix $\hat{H}(k)$ as follows:

$$\hat{H}(k) = \begin{bmatrix} \hat{h}_A(k)^* & \hat{h}_B(k)^* & \hat{h}_C(k)^* & 0 \\ \hat{h}_B(k)^* & -\hat{h}_A(k)^* & 0 & -\hat{h}_C(k)^* \\ \hat{h}_C(k)^* & 0 & -\hat{h}_A(k)^* & \hat{h}_B(k)^* \\ 0 & \hat{h}_C(k)^* & -\hat{h}_B(k)^* & -\hat{h}_A(k)^* \\ \hat{h}_A(k)^* & \hat{h}_B(k)^* & \hat{h}_C(k)^* & 0 \\ \hat{h}_B(k)^* & -\hat{h}_A(k)^* & 0 & -\hat{h}_C(k)^* \\ \hat{h}_C(k)^* & 0 & -\hat{h}_A(k)^* & \hat{h}_B(k)^* \\ 0 & \hat{h}_C(k)^* & -\hat{h}_B(k)^* & -\hat{h}_A(k)^* \end{bmatrix} \quad (11)$$

For each sub-carrier k, (k=1, 2, ..., K), the receiver collects received signal samples for one block of transmitted symbols. Thus, there are eight received signal samples for each sub-carrier k. Let $r_k$ denote the column vector of these eight received signal samples for sub-carrier k. From the vector $r_k$, the receiver obtains the 8-dimensional column vector $\tilde{r}_k$, whose first four elements are identical to the first four elements of $r_k$, and the other four elements are complex conjugates of the corresponding elements of $r_k$. The vector $\tilde{r}_k$ is then pre-multiplied by $\hat{H}(k)^{*T}$ to obtain the 4-dimensional vector $\hat{w}_k$, whose elements form the decision metrics corresponding to the four modulated data symbols transmitted over the sub-carrier k. Similar processing is carried out for all sub-carriers k (k=1, 2, ..., K) to obtain decision metrics for all of the modulated data symbols transmitted in a block. These decision metrics are used in standard decoding procedures to obtain an estimate of the original data.

Note that in the above example as well as in the earlier description it was assumed that a set of modulated data symbols was assigned to a sub-carrier and that the corresponding transmitted symbols were sent using that sub-carrier over "p" consecutive time-slots allocated to a block of data symbols. This arrangement has two implications—it entails an average processing delay of p/2 time-slots (since the entire block of data needs to be available at the receiver for processing); also, it requires the channel coefficients to be (more-or-less) constant over p time-slots. This may not be a major concern in several applications. However, in those cases where either the processing delay of p time-slots is unacceptable or where the channel cannot be expected to remain constant for p time-slots (say, because of the mobility of receiver devices), it is possible to reduce the delay by a significant amount. We accomplish this by exploiting the fact that in many situations the channel coefficients associated with adjoining sub-carriers are close to each other. As a result, we can group the sub-carriers into groups, each consisting of L contiguous sub-carriers, and assign each set of m modulated symbols to one such sub-carrier group. Since these m symbols require p transmission opportunities, we can transmit them over p/L time-slots since the sub-carrier group presents us with L transmission opportunities during each time-slot. This reduces the processing delay by a factor of L. We illustrate this concept with the following example where the same space-time code (with reuse factor 3) that was discussed above is used in an SFN with omni-directional antennas.

In this example, we divide the K sub-carriers into groups of size 2 (i.e. L=2) so that there are K/2 sub-carrier groups in all.

Figure 6:
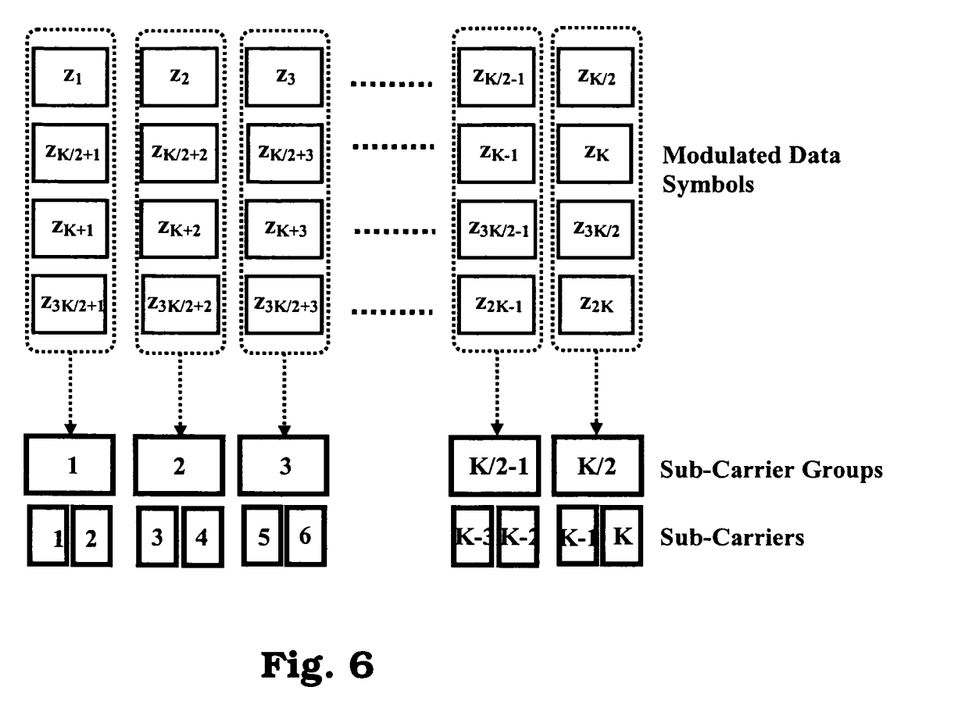
FIG. 6 shows a possible assignment of data symbols to sub-carrier groups according to one embodiment.

We assume that sub-carriers 1 and 2 are in group 1, sub-carriers 3 and 4 are in group 2, and so on. (In general, for k=1, 2, ..., K/2, the kth sub-carrier group consists of sub-carriers 2k−1 and 2k.) Also, each block consists of 2K modulated data symbols. FIG. 6 shows a possible assignment of these data symbols to sub-carrier groups according to one embodiment.

Figure 7:
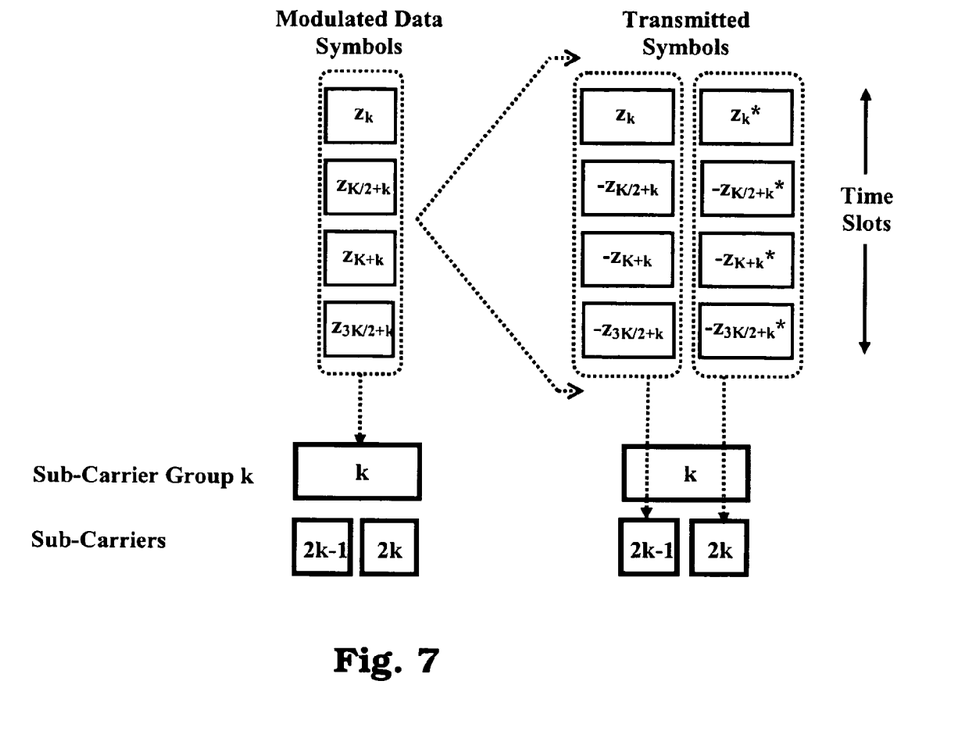
FIG. 7 shows a possible assignment of the eight transmitted symbols to the eight transmission opportunities provided by the kth sub-carrier group at a base station that has been assigned column A of the code matrix.

Once the 2K modulated data symbols in a block have been assigned to the K/2 sub-carrier groups, for each sub-carrier group the base station computes the eight symbols that are to be transmitted over the next four time-slots. As in the previous example, the column vector of the code matrix G that has been assigned to the base station determines the relationship between the modulated data symbols assigned to a sub-carrier group and the symbols that are actually transmitted over that sub-carrier group. Once the eight symbols that are to be transmitted are computed, they can be transmitted using the eight transmission opportunities the two sub-carriers provide over the next 4 time-slots. There is no requirement that these eight symbols being transmitted need to be assigned to the eight transmission opportunities in a specific manner. However, this assignment has to consistent over all the base stations participating in the SFN. FIG. 7 shows a possible assignment of the eight transmitted symbols to the eight transmission opportunities provided by the kth sub-carrier group at a base station that has been assigned column A of the code matrix. Assignment of transmitted symbols to transmission opportunities can be carried out in a similar manner for base stations using column B or column C of the code matrix.

It is easy to see that similar schemes can be constructed with sub-carrier groups of different sizes (e.g., 4 or 8 in the present case.) In general, any sub-multiple of the code parameter "p" can be considered a candidate for "L", which represents the size of a sub-carrier group. What choice of L would be appropriate for a given SFN would depend on the interplay between two factors: coherence time and coherence bandwidth for typical users of the SFN. A large coherence time means that channel coefficients remain essentially unchanged for long periods of time. Such would be the case for static users or mobile users moving at pedestrian speeds. If most of the users are likely to fall into this class, there would be no need to shorten the length of time over which one block of symbols is transmitted. That is, there may be little motivation to use sub-carrier groups with multiple sub-carriers. (L=1 would be quite appropriate in this case.) However, in a vehicular environment with short coherence times, one would feel the need to shorten the time over which a block of symbols is transmitted; i.e. one would try to use as large a sub-carrier group size as possible. How large this size can be depends on the typical coherence bandwidth of the system, which indicates how much channel coefficients vary across the frequency band. A large coherence bandwidth (which occurs if the delay spread at the receiver device is small) would permit the use of large values of L. All in all, the choice of L would be decided by the typical coherence bandwidth and coherence time of the intended environment.

All of the examples we have presented so far utilize rate ½ complex orthogonal codes. It should be clear, however, that the method we have presented is not restricted to the use of rate ½ codes only. If a higher rate code can be found that fits in with the desired reuse pattern, that code can be used in conjunction with the proposed method. We illustrate this point using a rate ¾ code. The code matrix, G, associated with this code is given by:

| Col. A | Col. B | Col. C |
|---|---|---|

$$G = \begin{bmatrix} x1 & x2 & x3/\sqrt{2} \\ -x2* & x1* & x3/\sqrt{2} \\ x3*/\sqrt{2} & x3*/\sqrt{2} & (-x1-x1*+x2-x2*)/2 \\ x3*/\sqrt{2} & -x3*/\sqrt{2} & (x1-x1*+x2+x2*)/2 \end{bmatrix}$$

In order to use the space-time code associated with the above code matrix, one will have to implement a reuse pattern with the reuse parameter equal to 3. Thus, base stations (or sectors) will be labeled A, B or C, and depending upon the label associated with a base station (or sector), the base station will use the transmission pattern given by the corresponding column of the code matrix. The stream of symbols to be transmitted is divided into groups of three symbols each, with each such group transmitted over four time-slots. Thus, if x1, x2 and x3 are symbols belonging to such a group, all base stations (or sectors) labeled A will transmit the symbols x1, −x2*, x3*/√2 and x3*/√2 over the four time-slots allocated for the transmission of that group. Those labeled B will transmit the symbols x2, x1*, x3*/√2 and −x3*/√2 over the same interval whereas those labeled C will transmit x3/√2, x3/√2, (−x1−x1*+x2−x2*)/2 and (x1−x1*+x2+x2*)/2.

It is easy to see that the above code has a coding rate of ¾ since each antenna transmits three symbols over four time-slots. Since the symbol x3 is transmitted twice by each antenna, in order to have identical energy per symbol irrespective of which symbol (or combination of symbols) is being transmitted, it is desirable to have $E[|x_1|^2]=E[|x_2|^2]=E[|x_3|^2]=\frac{2}{3}E$ where $E=E[|x|^2]$ is the average transmit energy per symbol as determined by the antenna power constraints. By writing out expressions for the real and imaginary parts of the received symbols in terms of the real and imaginary parts of the transmitted symbols (i.e., x1, x2 and x3), one can show that a linear processing operation at the receiver (similar to the pre-multiplication by the $\hat{H}$ matrix that was used in the previous examples) can be used to obtain estimates of the transmitted symbols. The resulting signal-to-noise ratio is given by $$\rho = \frac{1}{3}(|h_1|^2+|h_2|^2+|h_3|^2)E[|x|^2]/\sigma^2.$$

While the SINR for this rate ¾ code is a little smaller than that for the rate ½ codes, the increase in the coding rate (¾ instead of ½) yields additional bits that can be used to provide stronger channel coding for additional protection.

While reuse patterns of 3 and 7 have been described and illustrated above, it will be appreciated that other reuse patterns may be employed. Also, while the example embodiments were described with respect to four (in the case of the rate-¾ code) and eight time slots, it will be appreciated that more or less than eight and four time slots are possible.

The examples described above comprised SFNs wherein all base stations had either omni-directional antennas or they all had sectorized antennas with the same number of sectors (coverage areas) per base station. It is not a requirement of the present invention that this be so. The present invention can easily be applied to SFNs comprising base stations with different numbers of sectors—for example, some with a single sector, some with three sectors, some with six sectors, and so on. When applying the present invention to such an SFN, the code matrix and the corresponding reuse parameter should be selected so that column vectors of the code matrix can be assigned to different coverage areas to ensure that no two adjacent coverage areas are assigned the same column vector.

Another implicit assumption in the description of the examples given above was that there was a single transmit antenna for each sector or coverage area associated with a base station. That is, in the case of a base station with an omni-directional antenna, the base station's only coverage area was served by a single antenna, whereas in the case of a base station with multiple sectors or coverage areas, each sector or coverage area was served by a single antenna. The present invention is not restricted to such scenarios. It is easy to apply the present invention to scenarios where one or more of the sectors (i.e. coverage areas) associated with one or more base stations are served by more than one antenna. The present invention can be applied to such scenarios in two ways:

1. When multiple antennas serve a given coverage area associated with a base station, all of them are assigned distinct column vectors of the code matrix. Thus, not only adjacent coverage areas are assigned distinct column vectors of the code matrix, but also overlapping coverage areas (i.e. those associated with different antennas serving the same coverage areas belonging to a base station) are assigned distinct column vectors of the code matrix.
2. If multiple antennas serve a given coverage area associated with a base station, all of them use the same column vector of the code matrix. Thus, in this assignment, overlapping coverage areas are assigned the same column vector of the code matrix whereas adjacent coverage areas are assigned distinct column vectors of the code matrix. (It is also possible to envision an intermediate scenario where the multiple antennas serving a given coverage area are divided into subsets, with a distinct column vector assigned to each subset; all antennas within a subset use the same column vector.)

In the first assignment pattern (in the case of multiple antennas serving a given coverage area), the reuse parameter (i.e. the number of columns of the code matrix) is expanded to satisfy the requirement that all adjacent as well as overlapping coverage areas be assigned different column vectors of the code matrix. For instance, recall that in the first example with a single antenna per coverage area, a code with reuse parameter 3 was adequate to ensure that no two adjacent coverage areas would be assigned the same column vector of the code matrix. With two antennas per coverage area, a code with reuse parameter 3 would not be able to meet this requirement if the two antennas serving a coverage area are to be assigned distinct column vectors. In this case, a code with reuse parameter 6 will be needed to ensure that no pair of adjacent or overlapping coverage areas is assigned the same column vector of the code matrix.

In the second assignment pattern, where all antennas serving a given coverage area are assigned the same column vector of the code matrix, the reuse parameter (and the corresponding space-time code) that was adequate for the case of a single antenna per coverage area can be adopted to meet the requirement that no pair of adjacent coverage areas is assigned the same column vector. (In this assignment pattern, overlapping coverage areas, by definition, are assigned the same column vector.)

The invention being thus described, it will be obvious that the same may be varied in many ways. Such variations are not to be regarded as a departure from the invention, and all such modifications are intended to be included within the scope of the invention.

We claim:

1. A method of transmitting data in a single frequency network, comprising:
   constructing a generalized orthogonal space time code matrix having at least three columns, each of the columns of the matrix storing a distinct column vector therein;

assigning the column vectors to antennas serving coverage areas of a plurality of base stations such that each coverage area is associated with a different one of the column vectors; and transmitting same data from each of the plurality of base stations such that the same data transmitted by each of the plurality of base stations in a first coverage area of the coverage areas is transmitted using the column vector associated with the first coverage area and in coverage areas that are adjacent to the first coverage area the same data is transmitted by the plurality of base stations in the adjacent coverage areas using the column vectors associated with the adjacent coverage areas, wherein the constructing step constructs the matrix and the assigning step assigns the column vectors such that transmission in the coverage areas adjacent to the first coverage area by the plurality of base stations using a same one of the column vectors does not occur.

2. The method of claim 1, wherein one or more of the base stations are omni-directional such that each of the omni-directional base stations has a single coverage area.

3. The method of claim 1, wherein one or more of the base stations are sectorized such that each of the sectorized base stations has more than one coverage area.

4. The method of claim 1, wherein the assigning step assigns the column vectors based on a reuse parameter such that no two adjacent coverage areas are assigned the same column vector.

5. The method of claim 4, wherein the generalized orthogonal space time code matrix has a number of columns based on the reuse parameter.

6. The method of claim 1, wherein, at each base station, the transmitting step comprises:
dividing the data into sets of symbols; and
transmitting each set of symbols in each of the coverage areas of the base station.

7. The method of claim 6, wherein the transmitting each set of symbols step transmits each set of symbols over a plurality of time slots.

8. The method of claim 7, wherein the generalized orthogonal space time code matrix has a number of rows equal to a number of the plurality of time slots.

9. The method of claim 6, wherein, for each of the plurality of bases stations, the transmitting each set of symbols step transmits each set of symbols over a plurality of time slots on a corresponding sub-carrier belonging to a set of sub-carriers associated with the single frequency network.

10. The method of claim 1, further comprising:
assigning a plurality of sub-carriers to each of the plurality of base stations;
dividing the plurality of sub-carriers into groups; and wherein
the transmitting step includes, for each base station,
dividing the data into sets of symbols;
assigning the sets of symbols to the sub-carrier groups; and
transmitting each set of symbols over the assigned sub-carrier group.

11. The method of claim 10, wherein the transmitting each set of symbols step transmits each set of symbols over one or more time slots.

12. The method of claim 1, wherein the transmitting step transmits the same data from at least two antennas of at least one base station, the at least two antennas have overlapping coverage areas, and each of the overlapping coverage areas is assigned a different column vector.

13. The method of claim 1, wherein the transmitting step transmits the same data from at least two of the antennas of at least one base station, the at least two antennas have overlapping coverage areas, and each of the overlapping coverage areas is assigned a same column vector.

14. A single frequency network, comprising:
a plurality of base stations each having at least one coverage area, each coverage area associated different column vectors of a generalized orthogonal space time code matrix, the generalized orthogonal space time code constructed such that the matrix has at least three columns, each of the columns of the matrix storing a distinct one of the column vectors therein, the base stations configured to perform at least one of broadcasting and multicasting of data over a same frequency to one or more users within the at least one coverage area, antennas associated with each coverage area being assigned the column vectors such that each coverage area is associated with a different one of the column vectors, the plurality of base stations transmitting the data in each coverage area such that the data transmitted by each of the plurality of base stations in a first coverage area of the coverage areas is transmitted using the column vector associated with the first coverage area and in coverage areas that are adjacent to the first coverage area the same data is transmitted by the plurality of base stations in the adjacent coverage areas using the column vectors associated with the adjacent coverage areas, wherein the constructing of the matrix and the column vector assignment is such that the data transmitted in the coverage areas adjacent to the first coverage area by the plurality of base stations using a same one of the column vectors does not occur.

15. A method of receiving data in a single frequency network at one or more users tuned in coverage areas of a plurality of base stations, each coverage area associated with a column vector of a generalized orthogonal space time code matrix constructed to have at least three columns, each of the columns of the matrix storing a distinct column vector therein, the column vectors assigned to antennas serving the coverage areas such that each coverage area is associated with a different one of the column vectors, the method comprising:
deriving a modified received signal vector from received signal samples, the signal samples received at the one or more users in a first coverage area of the coverage areas being encoded using the column vector associated with the first coverage area and the signal samples being received at the one or more users in coverage areas that are adjacent to the first coverage area being encoded using the column vectors associated with the adjacent coverage areas;
multiplying the modified received signal vector by a receiver filter matrix, the receiver filter matrix including at least one channel estimate coefficient associated with each of the column vectors of the generalized orthogonal space time code matrix to obtain decision metrics; and
decoding data represented by the received signal samples based on the obtained decision metrics.

* * * * *